(12) United States Patent
Roberts et al.

(10) Patent No.: US 7,736,506 B2
(45) Date of Patent: Jun. 15, 2010

(54) SYSTEM AND METHOD FOR UNIFORMLY DISTRIBUTING A FLUID THROUGH A FILTER BED IN A FILTER

(75) Inventors: R. Lee Roberts, Chadds Ford, PA (US); Mark Kevin Addison, Bear, DE (US)

(73) Assignee: RG Delaware, Inc., Wilmington, DE (US)

( * ) Notice: Subject to any disclaimer, the term of this patent is extended or adjusted under 35 U.S.C. 154(b) by 893 days.

(21) Appl. No.: 11/588,210

(22) Filed: Oct. 27, 2006

(65) Prior Publication Data

US 2008/0099411 A1     May 1, 2008

(51) Int. Cl.
*B01D 24/46* (2006.01)
*B01D 29/62* (2006.01)
*B01D 41/02* (2006.01)

(52) U.S. Cl. .................. 210/269; 210/274; 210/275; 210/279; 210/291

(58) Field of Classification Search .................. 210/456, 210/405, 417–428, 269, 274, 275, 279, 291, 210/792–795, 154
See application file for complete search history.

(56) References Cited

U.S. PATENT DOCUMENTS

| | | | |
|---|---|---|---|
| 5,019,259 A | 5/1991 | Hambley |
| 5,087,362 A | 2/1992 | Brown |
| 6,306,310 B1 | 10/2001 | Bergmann et al. |
| 6,312,611 B1 | 11/2001 | Bergman et al. |
| 6,797,166 B1 | 9/2004 | Hambley et al. |

OTHER PUBLICATIONS

Leopold, Dec. 14, 1999, Universal Type SL Underdrain with IMS Cap, H-Flume Filter Arrangement and Orifice Plate Details, three (3) pages.

Tetra Technologies, Inc., Nov. 22, 1989, Gravity Filter Plant (General Arrangement. Filter Internals Sections and Details), three (3) pages.

*Primary Examiner*—Krishnan S Menon
*Assistant Examiner*—Katherine Zalasky
(74) *Attorney, Agent, or Firm*—Merek, Blackmon & Voorhees, LLC

(57) ABSTRACT

A system and method for uniformly distributing fluids (e.g., washing and in-service) through a filter bed of a filter. The system and method of the present invention can be used with any type of filter that uses media to remove impurities from a fluid. The filter bed can include one or more layers of media. The media can be natural (e.g., sand, gravel, anthracite, etc.) or can be fabricated (e.g., plastic). The filter media can be supported by one or more layers of gravel. Alternatively, the filter media can be supported by a porous plate or other support designed to replace the gravel layers. The present invention includes a system having a distribution member configured to uniformly distribute a fluid through a filter bed of a filter. Preferably, the distribution member can be readily installed by relatively unskilled labor in both existing filters and new filters. The distribution member is preferably configured to occupy only a small percentage of space in a distribution chamber (e.g., a flume). In retrofit applications, the design of the distribution member is such that no significant alteration of the distribution chamber or fluid velocity is necessary. Preferably, the distribution member includes one or more plates extending substantially the length of the distribution chamber. The plate or plates are designed to create a uniform pizeometric head at each lateral extending from the distribution chamber regardless of how far a given lateral is from the fluid inlet in the distribution chamber. In a most preferred embodiment, a single plate is used. The design of the single plate allows it to be mass produced and yet still be used in numerous different environments and flow conditions.

19 Claims, 10 Drawing Sheets

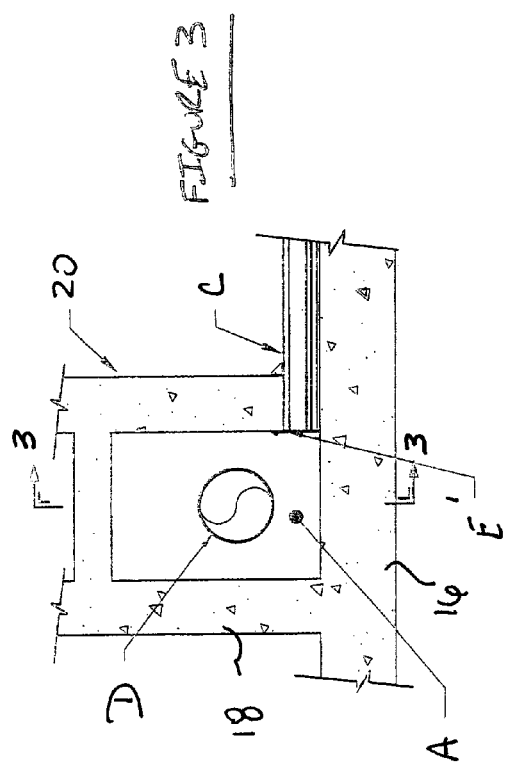
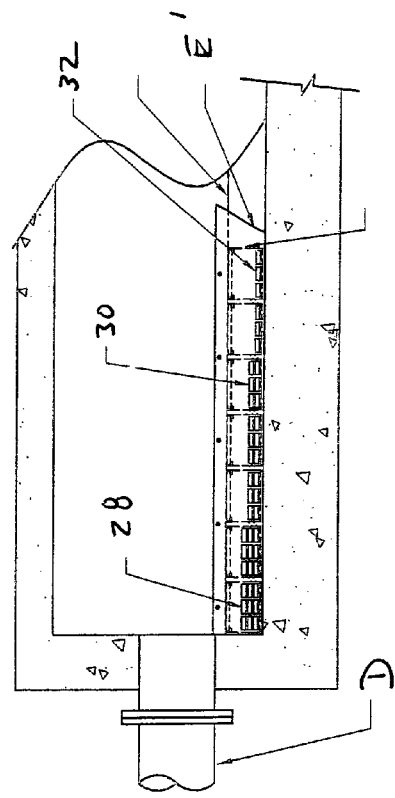

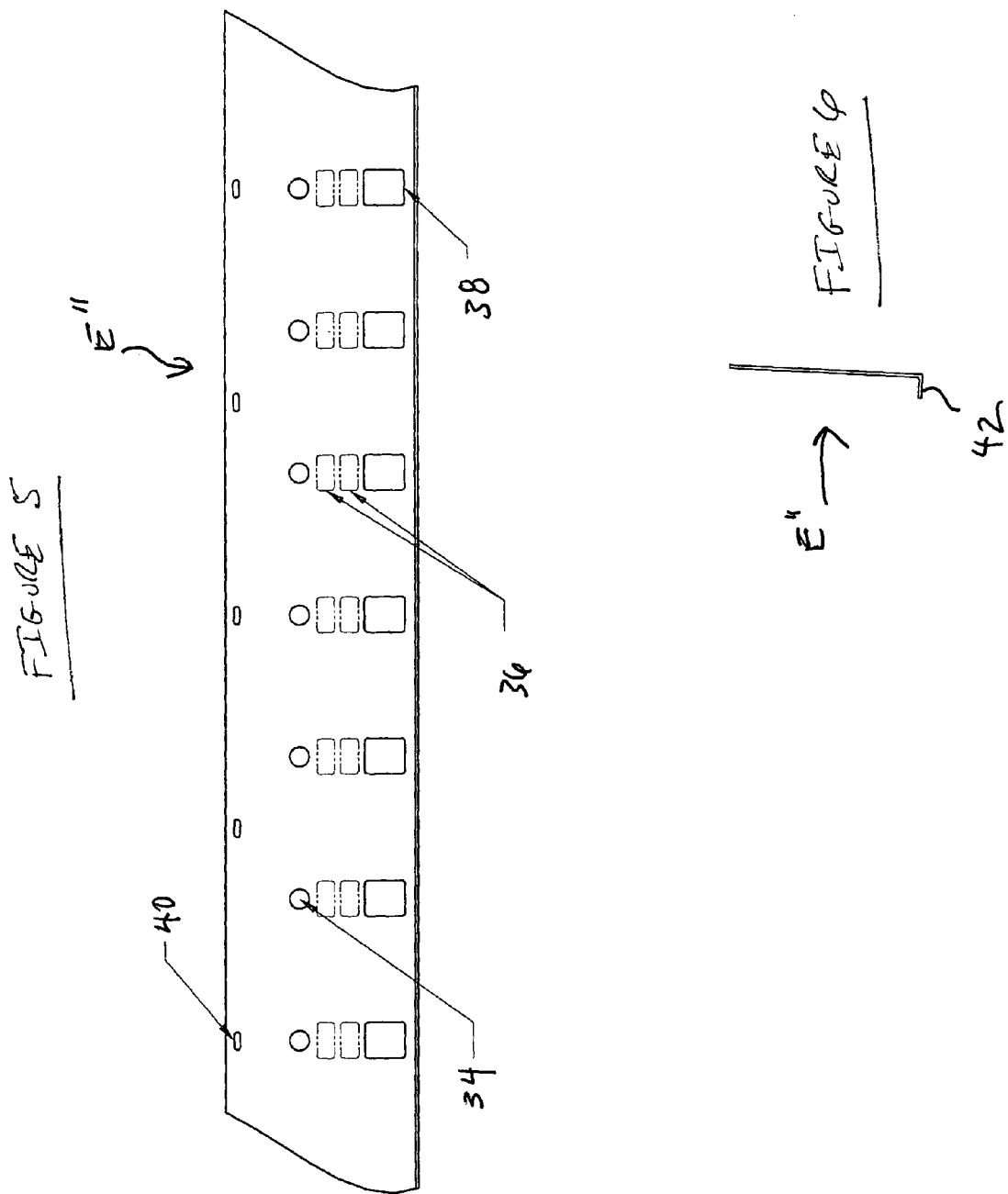

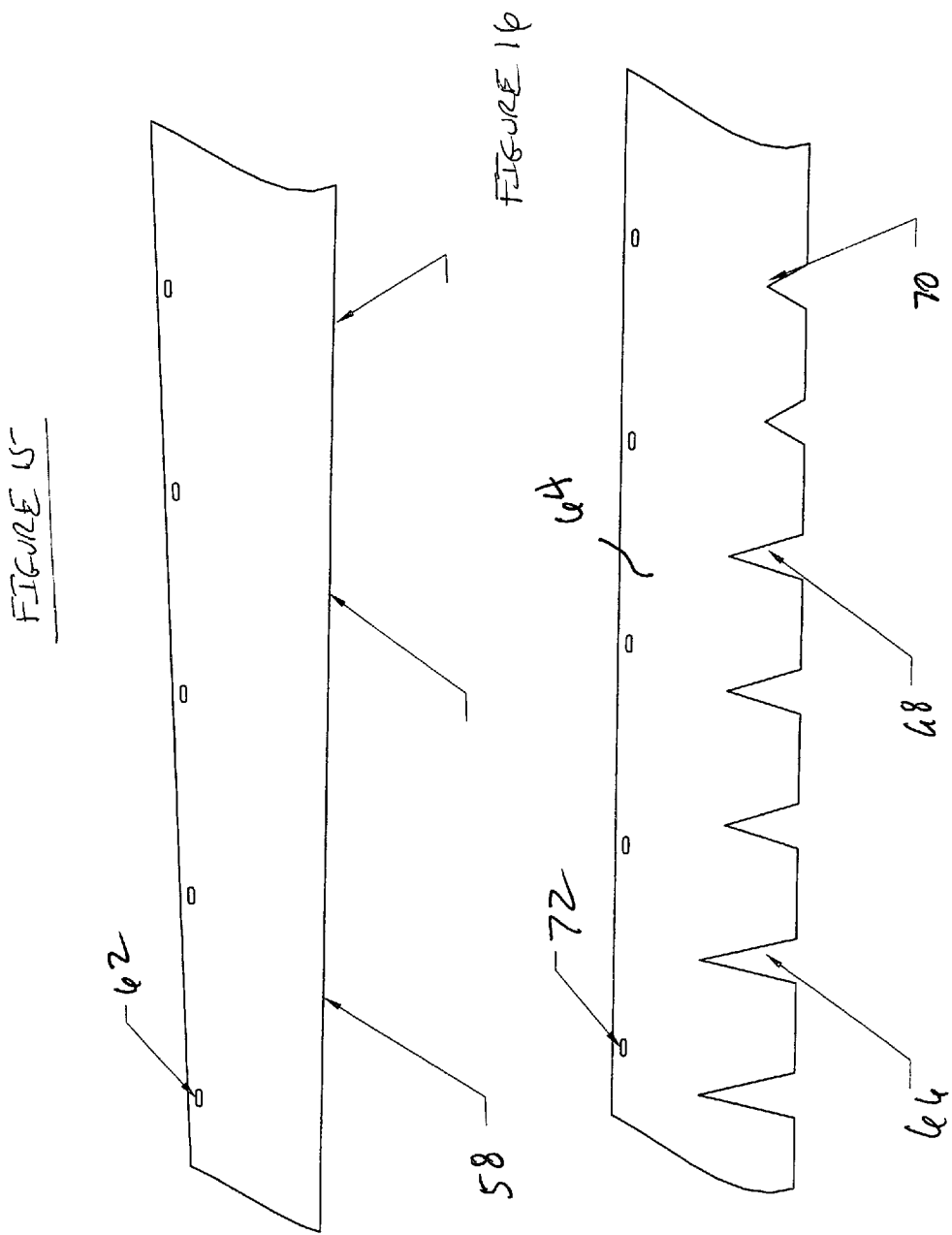

SYSTEM AND METHOD FOR UNIFORMLY DISTRIBUTING A FLUID THROUGH A FILTER BED IN A FILTER

FIELD OF THE INVENTION

The present invention is directed to a filter system in which one or more fluids pass through a filter bed at various times (e.g., a washing mode and/or a filtration mode). More specifically, the present invention is directed to a system and method for uniformly distributing one or more fluids (e.g., washing and/or in-service) through a filter bed in a filter. The fluids may include a liquid, a gas or a combination of a liquid and a gas. Where a combination of a liquid and gas is used, the liquid and gas can be directed through the filter bed simultaneously or separately. The present invention can be used in all types of filters including but not limited to downflow polishing filters, upflow polishing filters, upflow clarifiers/roughing filters, downflow clarifiers/roughing filters, bi-flow polishing filters or bi-flow roughing filters, etc. Further, the present invention can be used in existing filters or new filters. The present invention can be used in both water and wastewater applications.

BACKGROUND OF THE INVENTION

Filter beds formed from one or more layers of filter media have been employed in a variety of known filters for filtering water or wastewater to remove impurities from liquids. For example, filter beds of granular media have been used in upflow filters, downflow filters as well as other type of filters including bi-flow filters. After the filter has been operating for a while, it is necessary to wash the filter bed to remove the impurities trapped in the filter bed during the filtration mode. Various methods have been used to wash the filter bed including but not limited to the steps of: (i) liquid only wash; (ii) air only wash; (iii) liquid and air concurrently; (iv) liquid only followed by air only; (v) air only followed by liquid only; and, (vi) liquid and air concurrently followed by liquid only.

It is important that the washing fluid is thoroughly distributed through the filter bed during the washing mode in order to remove an adequate amount of the impurities trapped in the filter bed during operation of the filter in the filtration mode. It is similarly important to uniformly distribute in-service fluids during the filtration mode. Various underdrains systems have been used in an attempt to distribute fluids uniformly throughout the filter bed.

A common underdrain system includes a distribution chamber and a plurality of branches extending from the distribution chamber. In these types of systems, fluids (e.g., washing fluids and/or in-service fluids) are introduced into the distribution chamber (e.g., flume, gullet, plenum, header, etc.). As used herein "washing fluids" includes but is not limited to fluids directed in a direction opposite to the direction of filtration as well as fluids directed in the same direction as the direction of filtration) The fluid is then directed through a plurality of branches (e.g., laterals) operably connected to the distribution chamber. The laterals include openings that allow the fluid to be released into the filter bed. The distribution chamber and branches can take many different forms.

There have been many efforts directed at uniformly distributing fluids through the branches extending from the distribution chamber. Mal-distribution of fluids in this type of underdrain system stems from the fact that the initial velocity of the fluid in the distribution chamber is high and decreases over the length of the distribution chamber as fluid is diverted to various underdrain laterals or the like. This change in the velocity of the fluid over the length of the distribution chamber changes the velocity head over the length of the distribution chamber. Velocity head is an expression of how much energy is tied up in the momentum of the fluid. Bernoulli's equation is a version of the fundamental energy equation streamlined to describe fluid flow. Per this equation, an increase in velocity head will reduce the amount of piezometric or pressure head available. As a result, the branches near the fluid inlet in the distribution chamber, where the fluid velocity is the highest, will be exposed to a lower piezometric pressure. This results in a reduced flow of fluids through the branches located near the fluid inlet as compared to branches disposed further from the fluid inlet. Accordingly, the flow of fluid through the branches is not uniform. Hence, the fluid is not uniformly distributed to the filter bed that is undesirable in either a filtration mode or a washing mode.

A variety of methods and systems have been used to counteract the above-described mal-distribution of fluids through a filter bed. One attempt to overcome the mal-distribution of fluids requires reducing the velocity of the washing fluid introduced into a flume (e.g., center flume, end flume, etc.) to a maximum washing velocity of approximately 2 to 4 ft/sec. Other methods include tapering the flume cross-section in an effort to reduce changes in flume velocity, employing baffles to change the entrance flow characteristics of the washing fluids and using individual orifice plates at individual lateral entrances to match the lateral entrance losses to the available pressure head. These methods vary as to their degree of success in overcoming the mal-distribution of fluids. Also, these methods are often cost prohibitive to implement. Further, these methods are difficult or impossible to retrofit into an existing filter.

OBJECTS AND SUMMARY OF THE INVENTION

An object of a preferred embodiment of the present invention is to provide a novel and unobvious system and method for distributing a fluid (e.g., washing and/or in-service) uniformly through a filter bed in a filter.

Another object of a preferred embodiment of the present invention is to provide a distribution member that can be readily retrofitted into an existing filter system to assist in the uniform distribution of fluids through a filter bed of a filter.

A further object of a preferred embodiment of the present invention is to provide a distribution member that can be readily adjusted in the field to readily overcome numerous different conditions causing mal-distribution of fluids through a filter bed.

Yet still a further object of the present invention is to provide a distribution member that can be mass produced and yet still be able to overcome numerous different conditions causing mal-distribution of fluids through a filter bed.

Still another object of a preferred embodiment of the present invention is to provide a system and method that readily overcomes mal-distribution of fluids through a filter bed without reducing the velocity of the fluid introduced into the distribution chamber.

Still a further object of a preferred embodiment of the present invention is to provide a system and method that readily overcomes mal-distribution of fluids without any significant alteration to the distribution chamber.

Another object of a preferred embodiment of the present invention is to provide a system for overcoming mal-distribution of washing fluids that can be readily and inexpensively installed in an existing filter or a new filter.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to a system for use with a filter having a filter bed that is periodically subjected to a liquid, a gas and/or a combination of liquid and gas. The system includes a distribution chamber for receiving and distributing one or more fluids. The distribution chamber includes an inlet for receiving one or more fluids. A plurality of laterals are operably connected to the distribution chamber for receiving one or more fluids from the distribution chamber. The plurality of laterals are each configured to direct one or more fluids to a filter bed of a filter. The plurality of laterals include a first lateral spaced a first distance from the inlet of the distribution chamber and a second lateral spaced a second distance from the inlet of the distribution chamber. The first distance is different than the second distance such that a velocity of a fluid is greater at the first lateral than at the second lateral. A distribution plate extends across at least a portion of the first lateral and at least a portion of the second lateral. The distribution plate is configured to provide a first flow area through which one or more fluids from the distribution chamber pass into the first lateral and a second flow area through which one or more fluids from the distribution chamber pass into the second lateral. The first flow area is greater than the second flow area.

Another embodiment of the present invention is directed to a method of improving distribution of a fluid through a filter bed of a filter. The method includes the steps of: (a) providing a distribution chamber for receiving and distributing one or more fluids, the distribution chamber including an inlet for receiving one or more fluids; (b) providing a plurality of laterals operably connected to the distribution chamber for receiving one or more fluids from the distribution chamber, the plurality of laterals each being configured to direct one or more fluids to a filter bed of a filter, the plurality of laterals include a first lateral spaced a first distance from the inlet of the distribution chamber and a second lateral spaced a second distance from the inlet of the distribution chamber, the first distance being different than the second distance such that a velocity of a fluid is greater at the first lateral than at the second lateral; and, (c) positioning a distribution plate across at least a portion of the first lateral and at least a portion of the second lateral to form a first flow area through which one or more fluids from the distribution chamber pass into the first lateral and a second flow area through which one or more fluids from the distribution chamber pass into the second lateral, the first flow area is greater than the second flow area.

A further embodiment of the present invention is directed to a system for a filter having a filter bed for improving distribution of a fluid through the filter bed. The washing system includes a distribution plate for providing an interface between at least a portion of a fluid distribution chamber and a first portion and a second portion of an underdrain chamber. The distribution plate is configured to provide a first flow area through which a fluid passes from the distribution chamber into the first portion of the underdrain chamber and a second flow area through which a washing fluid passes from the distribution chamber into the second portion of the underdrain chamber. The first flow area is different from the second flow area to compensate for different piezometric heads at the first portion of the underdrain chamber and the second portion of the underdrain chamber.

Still another embodiment of the present invention is directed to a washing system for a filter having a filter bed for improving distribution of a washing fluid through the filter bed. The washing system includes a flume having at least one of a top wall and a bottom wall. The flume further includes a left sidewall and a right sidewall. A first underdrain lateral and a second underdrain lateral are operably connected to the flume. A distribution plate provides a first flow area between the flume and the first lateral and a second flow area between the flume and the second underdrain lateral. The first flow area is greater than the second flow area to compensate for different piezometric heads at the first underdrain lateral and the second underdrain lateral.

Yet still another embodiment of the present invention is directed to a washing system for a filter having a filter bed for improving distribution of a washing fluid through the filter bed. The washing system includes a flume having at least one of a top wall and a bottom wall. The flume further includes a left sidewall and a right sidewall. A first underdrain lateral and a second underdain lateral are operably connected to the flume. A distribution member provides a first flow area between the flume and the first underdrain lateral and a second flow area between the flume and the second underdrain lateral. The first flow area is greater than the second flow area to compensate for different piezometric heads at the first underdrain lateral and the second underdrain lateral. The distribution member is secured such that the distribution member does not move relative to the flume.

Still yet a further embodiment of the present invention is directed to a washing system for a filter having a filter bed for improving distribution of a washing fluid through the filter bed. The washing system includes a flume having at least one of a top wall and a bottom wall. The flume further includes a left sidewall and a right sidewall. A first underdrain lateral and a second underdrain lateral are operably connected to the flume. A distribution member provides a first flow area between the flume and the first underdrain lateral and a second flow area between the flume and the second underdrain lateral. The first flow area is larger than the second flow area. The distribution member includes a single plate having a first section forming the first flow area and a second section forming the second flow area.

Another embodiment of the present invention is directed to a washing system for a filter having a filter bed for improving distribution of a washing fluid through the filter bed. The washing system includes a flume having at least one of a top wall and a bottom wall. The flume further includes a left sidewall and a right sidewall. A first underdrain lateral and a second underdrain lateral are operably connected to the flume. A distribution member has first and second sections. The first section forms a flow area between the flume and the first underdrain lateral. The second section forms a flow area between the flume and the second underdrain lateral. At least one of the first and second sections includes a plurality of knock-outs for varying a size of a corresponding flow area.

Still another embodiment of the present inventions is directed to a washing system for a filter having a filter bed for improving distribution of a washing fluid through the filter bed. The washing system includes a fluid distribution chamber and at least first and second underdrain laterals operably associated with the fluid distribution chamber to direct a washing fluid through a filter bed of a filter. A distribution member provides an interface between at least a portion of a fluid distribution chamber and the at least first and second underdrain laterals. The distribution member is configured to provide a first flow area through which a washing fluid passes from the distribution chamber into the first underdrain lateral and a second flow area through which a washing fluid passes from the distribution chamber into the second underdrain lateral. The first flow area is different from the second flow area to compensate for different piezometric heads at the first underdrain lateral and the second underdrain lateral. The fluid distribution member is positioned entirely on one side of a vertical plane bisecting the fluid distribution chamber into two equal parts.

A further embodiment of the present invention is directed to a system for a filter having a filter bed for improving distribution of a fluid through the filter bed. The system includes a distribution member for providing an interface between at least a portion of a fluid distribution chamber and an underdrain chamber. The distribution member is configured to provide a first flow area through which a fluid passes from the distribution chamber into a first portion of the underdrain chamber and a second flow area through which a fluid passes from the distribution chamber into a second portion of the underdrain chamber. The first flow area is different from the second flow area to compensate for different piezometric heads at the first portion of the underdrain chamber and the second portion of the underdrain chamber. The distribution member has a substantially L-shaped cross-section.

BRIEF DESCRIPTION OF THE DRAWINGS

FIG. 3 is a fragmentary cross-sectional view of a portion of a filter including the flume and a portion of the adjoining filter compartment formed in accordance with another embodiment of the present invention.

FIG. 4 is a fragmentary cross-sectional view taken along lines 4-4 in FIG. 3.

FIG. 5 is a fragmentary front view of one of many possible configurations of a distribution plate formed in accordance with the present invention.

FIG. 6 is a side view common to the three different distribution plates depicted in FIGS. 1 to 5.

FIGS. 15 to 18 are front views of secondary distribution plates that can be used with the primary distribution plate depicted in FIG. 14. Alternatively, the secondary distribution plates depicted in FIGS. 15 to 18 can be used by themselves, i.e., without a primary distribution plate.

DETAILED DESCRIPTION OF THE PREFERRED EMBODIMENTS OF THE INVENTION

The preferred forms of the invention will now be described with reference to FIGS. 1 to 18. The appended claims are not limited to the preferred forms and no term and/or phrase used herein is to be given a meaning other than its ordinary meaning unless it is expressly stated otherwise.

Figure 1:
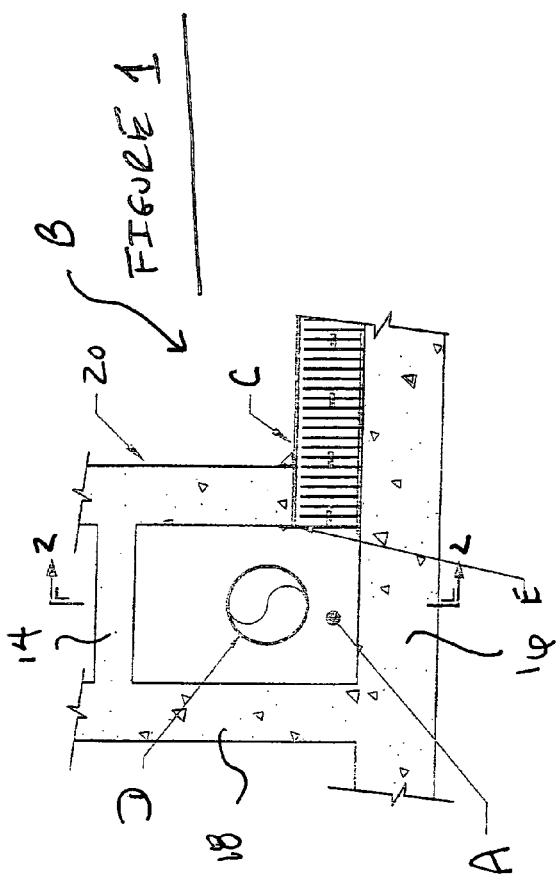
FIG. 1 is a fragmentary cross-sectional view of a portion of a filter including the flume and a portion of the adjoining filter compartment formed in accordance with an embodiment of the present invention.
Figure 2:
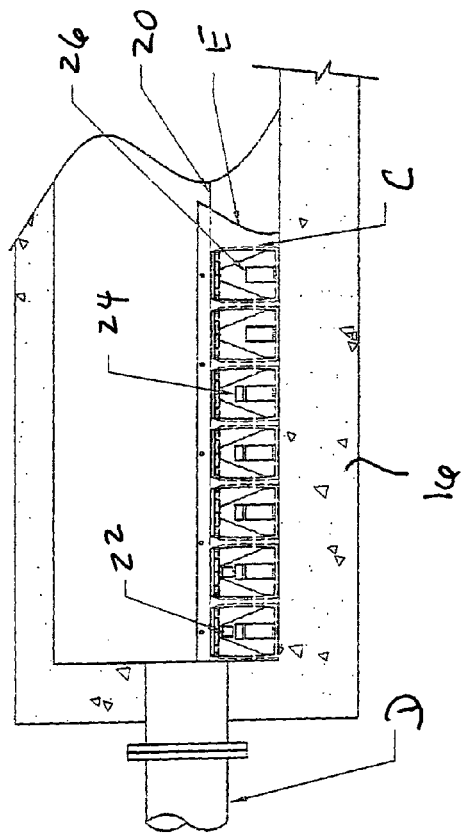
FIG. 2 is a fragmentary cross-sectional view taken along lines 2-2 in FIG. 1.

FIGS. 1 and 2

Referring to FIGS. 1 and 2, a fragmentary portion of flume A formed in accordance with a preferred embodiment of the present invention is illustrated. Flume A preferably includes a top wall 14, a bottom wall 16, a left sidewall 18 and a right sidewall 20 as depicted in FIG. 1. Preferably, the bottom wall is at approximately the same elevation as the bottom of the filter compartment/housing B as shown in FIG. 1. This arrangement is often referred to as flat bottom flume. However, it should be understood that the present invention may be used with other types of flumes including but not limited to flumes having a bottom lower than the bottom of the corresponding filter housing often referred to as recessed bottom flumes. The right sidewall 20 of flume A also forms a wall of filter compartment/housing B. Sidewall 20 does not extend all the way down to bottom wall 16. This configuration (i.e., a sidewall of the flume being removed from the flume bottom) is known as a "floating wall."

Preferably, underdrain laterals C extend into the space between sidewall 20 and bottom wall 16. A filter bed (not shown) is disposed above the underdrain laterals. The filter bed may include one or more layers of filter media supported by one or more layers of support gravel. The filter media may be buoyant or non-buoyant. The filter media may be naturally occurring or synthetic. The support gravel may be omitted. In such cases, a porous plate or other support structure may be used to support the filter media above the underdrain laterals C in such a manner so as to prevent openings in the top of the laterals C from becoming clogged by the filter media.

Underdrain laterals C can be of any known or subsequently developed design including but not limited to the INFINITY® underdrain or TRILATERAL® underdrain. Underdrain laterals C have an open end that is in fluid communication with flume A. As previously explained, underdrain laterals C preferably have a plurality of openings formed in the top of the laterals through which a fluid is directed to the filter bed. As seen in FIG. 2, underdrain laterals C are positioned in a side-by-side manner along the length of flume A. Each underdrain lateral C can be one continuous piece or a plurality of blocks oriented in an end-to-end fashion.

A fluid inlet pipe D is in fluid communication with flume A to introduce a liquid (e.g., filtered or unfiltered water) into flume A. As is readily evident from FIG. 2, underdrain laterals C are spaced at different distances from the fluid inlet pipe D. As such, the velocity of the washing fluid at each underdrain lateral C can and typically does vary due at least in part to the diversion of fluid flow into the laterals C. This can lead to a different pizeometric head at each underdrain lateral C resulting in mal-distribution of the fluid through the underdrain laterals C. To overcome the mal-distribution issue, a distribution plate E is preferably used to provide an interface between at least a portion of flume A and each of the underdrain laterals C. Distribution plate E has a profile as depicted in FIG. 6. Preferably, distribution plate E extends substantially the entire length of flume A to form an interface between all underdrain laterals C and flume A. Further, distribution plate E preferably extends above the underdrain laterals C. Distribution plate E may be secured in any conventional manner. One of many methods for securing distribution plate E is depicted in FIGS. 1 and 2. Specifically, conventional fasteners are used to secure the upper portion of distribution plate E to sidewall 20 just above the underdrain laterals C. The lower lip (similar to lip 42 illustrated in FIG. 6) of distribution plate E is secured to bottom wall 16 by conventional fasteners.

Referring to FIG. 2, distribution plate E includes a plurality of apertures extending therethrough. The size, shape and number of apertures may be varied as desired. The apertures are preferably sized to pass the desired amount of flow to each underdrain lateral C while inducing a desired degree of headloss which will compensate for changes in pizeometric head resulting from velocity head changes, friction loss down the length of the flume, turbulence, or other causes thus improving flow distribution into the underdrain laterals C. The size, shape and number of apertures may be varied to match the pressure profile in the flume. For example, consider a conventional filter with a water only underdrain and a filter flume with an initial average velocity of 6 ft/s at the design wash flow rate. The flow and corresponding velocity down the length of the flume will decrease as flow goes into the laterals and will approach 0 ft/s at the far end of the flume. The change in velocity head can be determined by the expression $$\frac{V_2^2 - V_1^2}{2g}.$$

In this example the change in velocity head is $$\frac{0^2 - 6^2}{(2)(32.174)} = -.56 \text{ ft.}$$

water column that indicates that the available piezometric head is approximately 0.56 ft less at the beginning of the flume than the far end of the flume. Thus, the flow to the laterals furthest from inlet D will be substantially greater than the flow to the laterals nearest inlet D. To compensate for the lower piezometric head nearest the inlet D, the aperture area for the entrance to the first few laterals is sized to create approximately 0.56 ft. less headloss at the design flow rate than the entrance apertures for the far laterals. One method used for sizing the aperture area is to use the well known flow vs. headloss relationship of $Q=cA\sqrt{2gh}$, where Q=flow, c=the orifice discharge coefficient, A=the cross-sectional area of the orifice, g=gravitational constant, and h=headloss across the orifice. Using the same method, the apertures for the laterals at any location of the flume can be sized to compensate for the change in velocity head at that location. Thus, using this invention, a flume can be designed for much higher velocities than typical designs resulting in smaller flumes and lower construction costs. Further, existing filters with undersized flumes can be retrofitted to provide superior flow distribution. This invention will also improve distribution in applications where the fluid inlet pipe is undersized, creating a high entrance velocity. The jet effect of this high entrance velocity will create low piezometric head in this region that can be compensated for by this invention. The design can be used for water, air, or other fluids and allows for nearly unlimited flexibility to accommodate various underdrain designs and filter configurations. The apertures may be placed to optimize flow distribution in the flume and mitigate the effects of velocity head, jet effect, turbulence and other flow disturbances.

Referring to FIG. 2, distribution plate E has a first set of three apertures 22 formed adjacent the open ends of the two underdrain laterals C closest to inlet D. Distribution plate E has a second set of two apertures 24 positioned adjacent the open ends of the next three underdrain laterals. Distribution plate E has a third set of single apertures 26 positioned adjacent the open ends of the next two laterals C. The first set of apertures 26 provides a greater flow area through which a fluid travels to pass into the corresponding laterals than the second and third sets of apertures 24 and 26. The second set of apertures 24 provides a greater flow area than the third set of apertures 26. By providing a vehicle for readily varying the flow area along the length of flume A, the present invention is able to ensure a greater uniformity in the distribution of fluids through the underdrain laterals and hence through the filter bed.

The apertures may be formed using any known or subsequently developed technique. Further, at the time of manufacture, the apertures can be completely formed or merely partially formed. For example, distribution plate E can be formed with knock-outs corresponding to all or just some apertures depicted in FIG. 2. At time of installation, the knock-outs can be removed to vary the flow area formed adjacent a given underdrain lateral C. In this manner, distribution plate E can be mass produced and yet still be able to compensate for a variety of different circumstances causing mal-distribution of fluids. As is readily evident from FIG. 1, distribution plate E occupies only a very small percentage volume of flume A. It should be further noted that the distribution plate E could be located outside of the flume A, for example directly below the floating wall and, therefore, occupy no portion of the volume of flume A. Preferably, distribution plate E occupies a minor portion (i.e., less than half) of the volume of flume A. Most preferably, distribution plate E occupies a negligible portion of the volume of flume A. Further, distribution plate E preferably does not require any significant structural change to flume A.

Distribution plate E may be constructed of steel, stainless steel, PVC, HDPE, or other materials with adequate strength, rigidity, corrosion resistance and wear resistance. The apertures in distribution plate E may be formed by cutting, punching, lasers, water jets, or other methods.

The fluid distributed by the present invention may be fluid passing through the filter bed during a filtration mode or a washing mode.

It should be noted that while this embodiment of the present invention is illustrated as having numerous underdrain laterals, it can be used in filters having one large underdrain chamber/plenum (e.g., wheeler bottoms, nozzle bottoms or any false bottom) as opposed to an underdrain chamber/plenum that has a number of distinct members.

FIGS. 3 to 7

FIGS. 3 and 4 illustrate a portion of a filter system that is very similar to that depicted in FIGS. 1 and 2. It should be noted that common elements have been given the same reference numerals. The only difference between the embodiment depicted in FIGS. 3 and 4 and the embodiment depicted in FIGS. 1 and 2 is distribution plate E'.

Three different set of apertures 28, 30 and 32 are formed in plate E' to form different flow areas. The first set 28 includes three columns of apertures with three apertures in each column. The second set 30 includes three columns of apertures with two apertures in each column. The third set 32 includes three columns of apertures with only one aperture in each column. Once again, all or just some of the apertures in any one set can be completely or partially formed at the time of manufacture.

Figure 7:
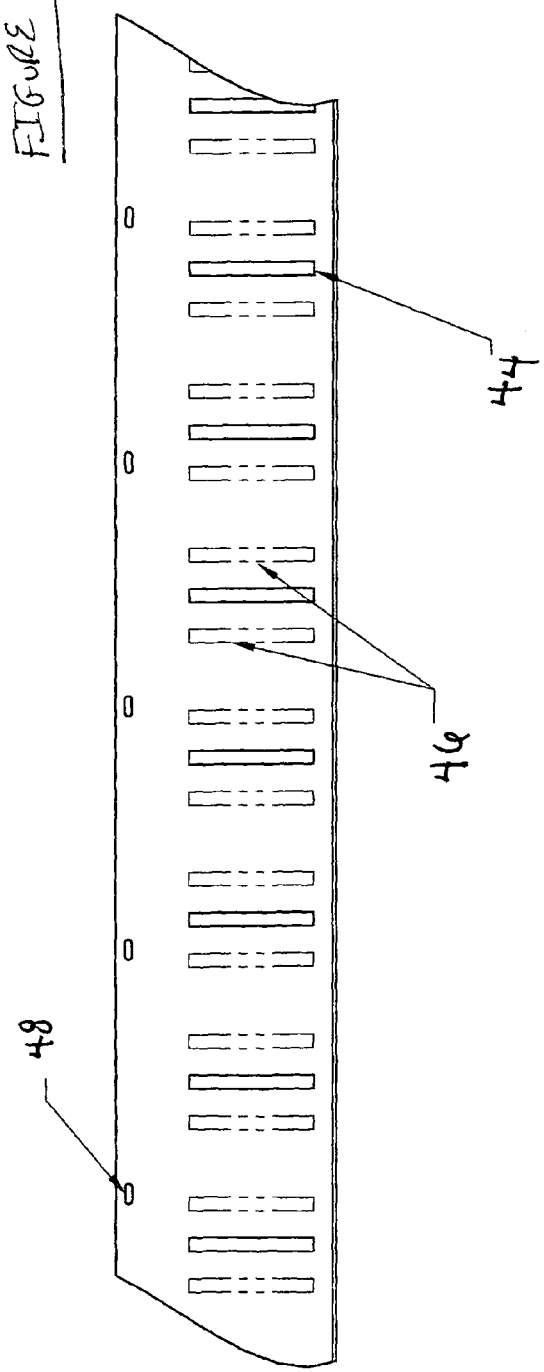
FIG. 7 is a fragmentary front view of yet another configuration of a distribution plate formed in accordance with the present invention.
Figure 8:
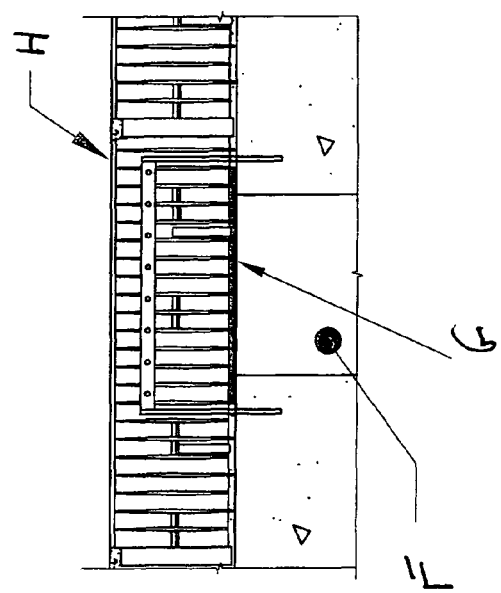
FIG. 8 is a fragmentary cross-sectional view of a center flume formed in accordance with a further embodiment of the present invention.
Figure 9:
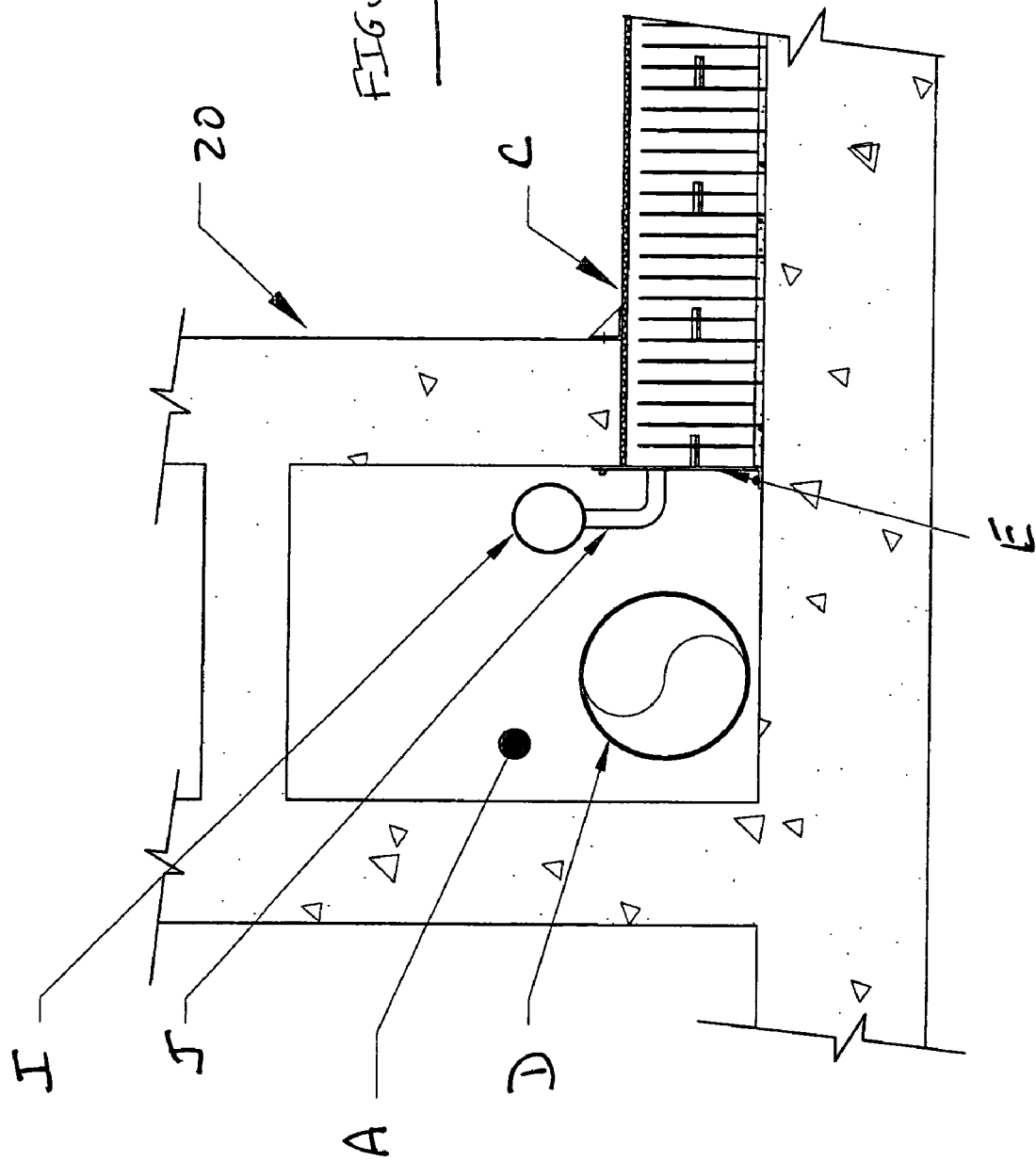
FIG. 9 is a fragmentary cross-sectional view of yet another embodiment of the present invention.
Figure 10:
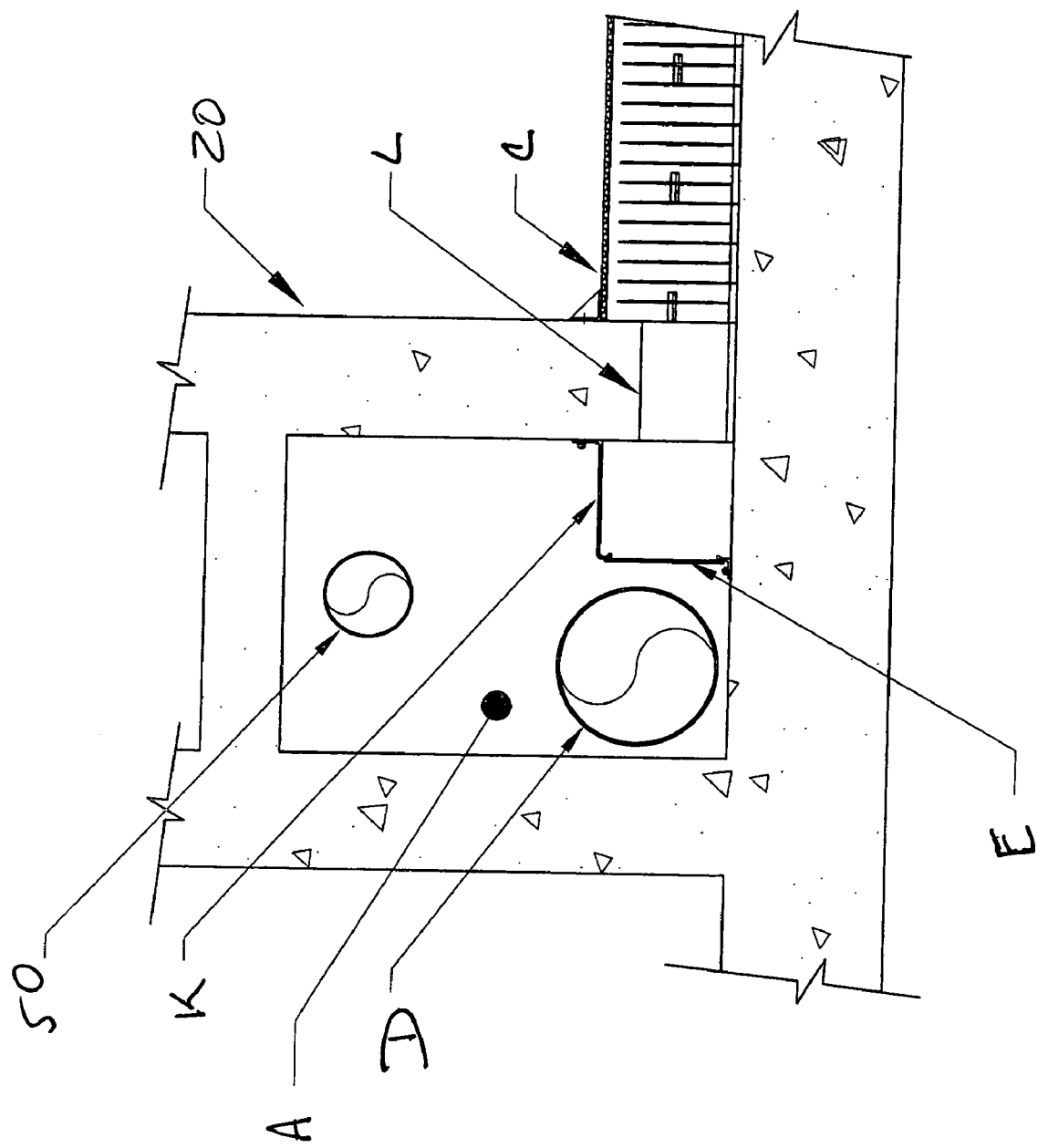
FIG. 10 is a fragmentary cross-sectional view of still another embodiment of the present invention.

Referring to FIGS. 5 and 6, another form of distribution plate is illustrated. Specifically, distribution plate E" has an L-shaped profile and cross-section as is readily evident from FIG. 6. It should be noted that distribution plates E and E' preferably have the same L-shaped cross-section and profile. However, it will be readily appreciated that other configurations may be used. Distribution plate E" incorporates a circular shaped aperture 34, two rectangular knock-outs 36 and one square aperture 38 to form distinct flow areas along the length of distribution plate E". The knock-outs 36 can be selectively removed prior to installation of the plate E" to provide different size flow areas along the length of plate E". For example, one or both knock-outs in the first two columns could be removed while the knock-outs in the other columns remain in place. This is just one of many examples of configurations that can be formed with plate E". Mounting slots 40 are formed in the upper portion of plate E" and lip 42 to facilitate attachment of plate E" . Referring to FIG. 7, distribution plate E'" is illustrated. The flow areas along this plate include one preformed slot 44 and two similarly shaped knock-outs 46. Mounting slots 48 are provided in the same fashion as discussed in connection with the embodiment disclosed in FIGS. 5 and 6.

FIG. 8

In this embodiment a center flume F is illustrated. A distribution plate G provides an interface between at least a portion of flume F and a plurality of underdrain laterals H. The distribution plate G can be configured in a similar fashion to those distribution plates previously or subsequently discussed.

FIG. 9

This embodiment is similar to the embodiment depicted in FIGS. 1 and 2. Common elements have been given the same reference numerals. This embodiment differs in that an air header I is disposed in flume A having drop pipes J connecting the air header I to each of the underdrain laterals C. In this embodiment, distribution plate E would also include an aperture adjacent each underdrain lateral C for receiving a corresponding drop pipe J.

FIG. 10

This embodiment is similar to the embodiment depicted in FIGS. 1 and 2. Common elements have been given the same reference numerals. This embodiment differs in that distribution plate E forms a portion of distribution box K. Distribution plate E may include flow areas similar to those previously or subsequently described for distributing air and/or liquid. Air is provided by air inlet pipe 50. Distribution plate E can also be designed to provide a secondary air/water interface in flume A of the type described in U.S. Pat. Nos. 6,306,310 and 6,312,611. The distribution plate E may be detachably connected so that it can be readily removed. Plate E may be secured with snap lugs, fasteners, adhesives or other means.

Distribution box K preferably extends the length of flume A and communicates with laterals C through air/water wall sleeves L formed in wall 20.

Figure 11:
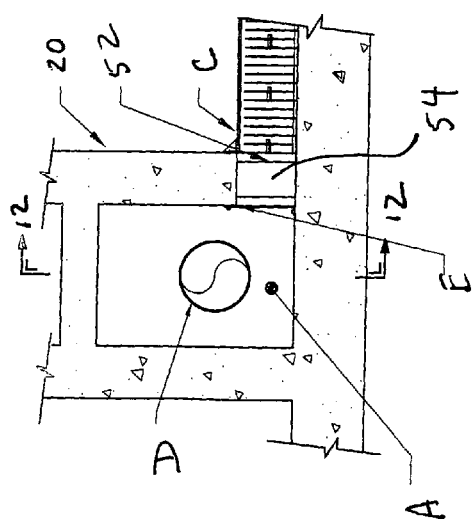
FIG. 11 is a fragmentary cross-sectional view of yet still another embodiment of the present invention.
Figure 12:
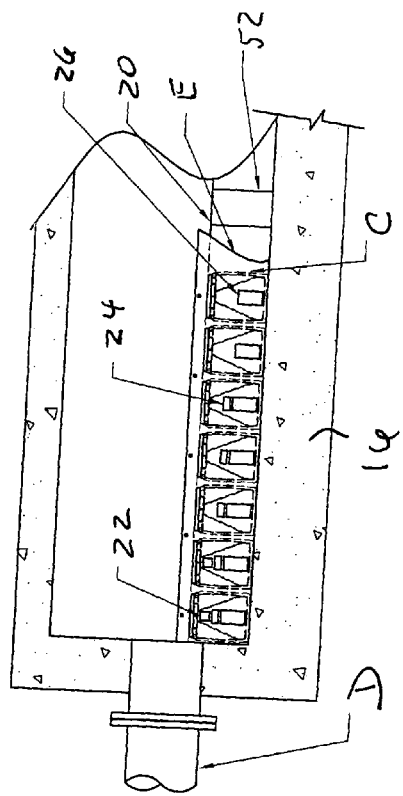
FIG. 12 is a fragmentary cross-sectional view taken along lines 12-12 in FIG. 11.

FIGS. 11 and 12

This embodiment is similar to the embodiment depicted in FIGS. 1 and 2. Common elements have been given the same reference numerals. This embodiment differs in that the floating wall 20 is supported by piers, posts or extensions 52. In this embodiment, the underdrain laterals C extend if at all only minimally under the wall 20. A sub-flume or secondary distribution chamber 54 is formed below floating wall 20 that allows the washing fluid flow to redistribute around the supports 52 and feed the obstructed laterals C.

FIGS. 13 to 18

Figure 13:
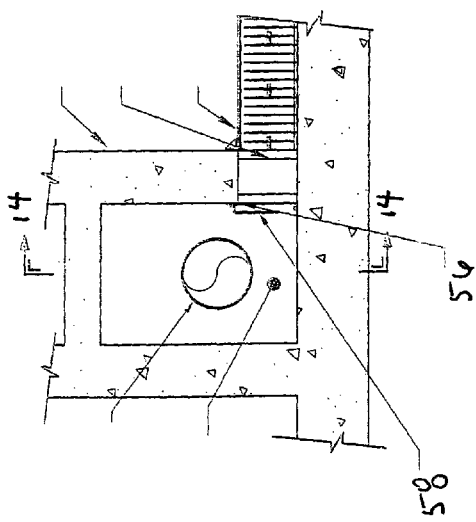
FIG. 13 is a fragmentary cross-sectional view of yet still a further embodiment of the present invention.
Figure 14:
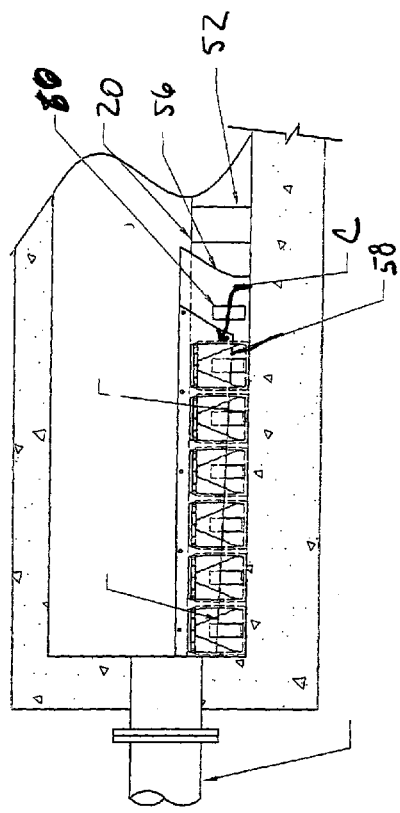
FIG. 14 is a fragmentary cross-sectional view taken along lines 14-14 in FIG. 13.

The embodiment depicted in FIGS. 13 to 15 is similar to the embodiment depicted in FIGS. 11 and 12. Common elements have been given the same reference numerals. This embodiment differs in that two distribution plates 56 and 58 are utilized. Distribution plate 56 includes uniformly shaped and sized apertures 60 aligned with the open ends of each underdrain lateral C. As is readily seen in FIG. 15, plate 58 is tapered to vary the flow area through which a washing fluid passes into each of the underdrain laterals C. More specifically, the taper in plate 58 is such that less of aperture 60 formed in plate 56 closest to inlet D is obstructed than that of aperture 60 formed in plate 56 furthest from inlet D. Plate 58 includes slots 62 to facilitate mounting. The orientation of plates 56 and 58 may be reversed. While this embodiment is shown with a floating wall having supports, it may be used in any type of distribution chamber including but not limited to center flumes.

Figure 17:
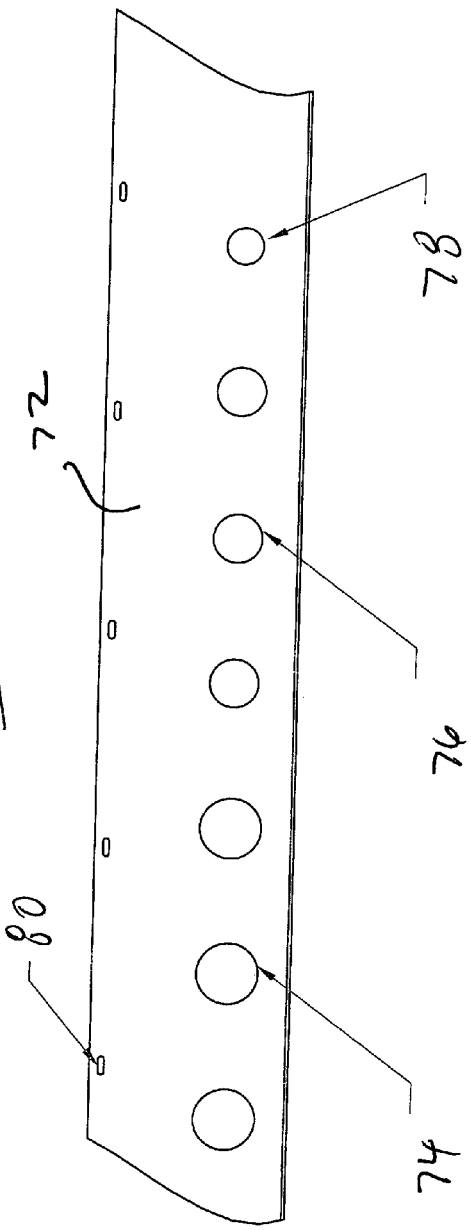
Figure 18:
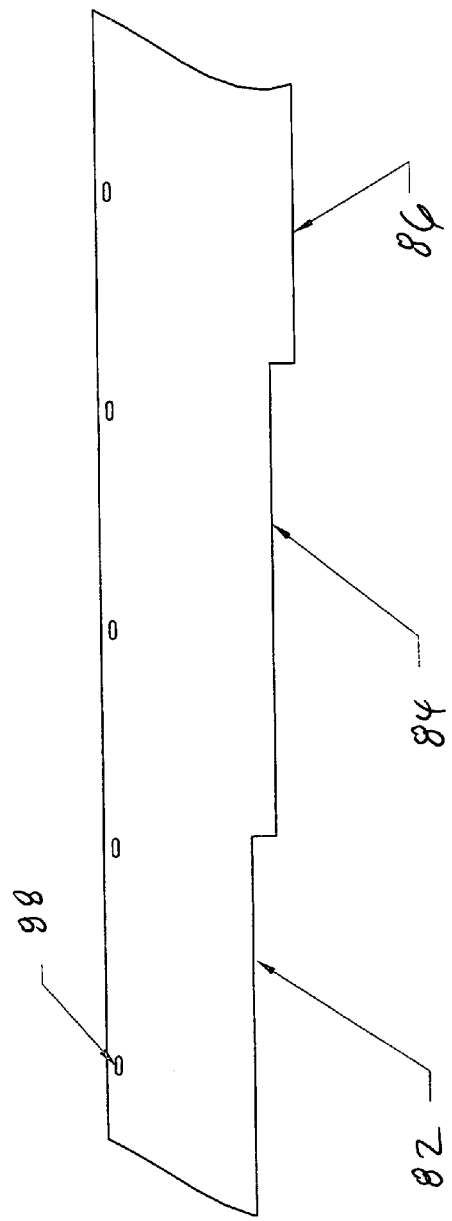

FIGS. 16 to 18 disclose alternative configurations for plate 58. It will be readily appreciated that any of the plate designs depicted in FIGS. 15 to 18 can be used by themselves, i.e., without plate 56. Referring to FIG. 16, plate 64 includes a plurality of differently sized v-shaped apertures/notches 66, 68 and 70 forming differently sized flow areas. Mounting slots 72 are also provided. Referring to FIG. 17, plate 72 includes a plurality of differently sized circular apertures 74, 76 and 78 forming differently sized flow areas. Mounting slots 80 are also provided. Referring to FIG. 18, steps 82, 84 and 86 are provided to form differently sized flow areas. Mounting slots 88 are also provided.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A system for use with a filter having a filter bed that is periodically subjected to fluids including a liquid, a gas and/or a combination of liquid and gas; said system comprising:
 (a) a distribution chamber for receiving and distributing one or more fluids, said distribution chamber including an inlet for receiving one or more fluids;
 (b) a plurality of laterals operably connected to said distribution chamber for receiving one or more fluids from said distribution chamber, said plurality of laterals each being configured to direct one or more fluids to a filter bed of a filter, said plurality of laterals including a first lateral being spaced a first distance from said inlet of said distribution chamber and a second lateral being spaced a second distance from said inlet of said distribution chamber, said first distance being different than said second distance such that a velocity of a fluid is greater at said first lateral than at said second lateral; and, (c) a distribution plate extending across at least a portion of said first lateral and at least a portion of said second lateral, said distribution plate being configured to provide a first flow area through which one or more fluids from said distribution chamber pass into said first lateral and a second flow area through which one or more fluids from said distribution chamber pass into said second lateral, said first flow area being greater than said second flow area, said distribution plate includes at least one knock-out for varying the size of at least one of said first flow area and said second flow area.

2. A system as set forth in claim 1, wherein:
(a) said distribution plate is configured to provide a third flow area through which one or more fluids from said distribution chamber pass into a third lateral, said third flow area being smaller than said first flow area and said second flow area.

3. A system as set forth in claim 1, wherein:
(a) said first flow area is formed by at least a first aperture in said distribution plate; and,
(b) said second flow area is formed by at least a second aperture in said distribution plate, said first aperture is spaced from said second aperture.

4. A system as set forth in claim 1, wherein:
(a) said distribution plate includes a plurality of knock-outs for varying the size of said first flow area and a size of said second flow area.

5. A system as set forth in claim 1, wherein:
(a) said first flow area is formed by a plurality of apertures in said distribution plate; and,
(b) said second flow area is formed by a plurality of apertures in said distribution plate.

6. A system for a filter having a filter bed for improving distribution of a fluid through the filter bed, said system including:
(a) a distribution plate for providing an interface between at least a portion of a fluid distribution chamber and a first portion and a second portion of an underdrain chamber, said distribution plate being configured to provide a first flow area through which a fluid passes from said distribution chamber into said first portion of said underdrain chamber and a second flow area through which a fluid passes from said distribution chamber into said second portion of said underdrain chamber, said first flow area being different from said second flow area to compensate for different piezometric heads at said first portion of said underdrain chamber and said second portion of said underdrain chamber, said distribution plate includes at least one knock-out for varying a size of at least one of said first flow area and said second flow area.

7. A system as set forth in claim 6, wherein:
(a) said distribution plate includes a plurality of knock-outs for varying a size of at least one of said first flow area and said second flow area.

8. A washing system for a filter having a filter bed for improving distribution of a washing fluid through the filter bed, said washing system including:
(a) a flume having at least one of a top wall and a bottom wall, said flume further including a left sidewall and a right sidewall;
(b) a first underdrain lateral and a second underdrain lateral, said first underdrain lateral and said second underdrain lateral being operably connected to said flume; and,
(a) a distribution plate providing a first flow area between said flume and said first lateral and a second flow area between said flume and said second underdrain lateral, said first flow area being greater than said second flow area to compensate for different piezometric heads at said first underdrain lateral and said second underdrain lateral, said distribution plate includes at least one knock-out for varying a size of at least one of said first flow area and said second flow area.

9. A washing system as set forth in claim 8, wherein:
(a) said flume is an end flume.

10. A washing system as set forth in claim 8, wherein:
(a) said flume is a center flume.

11. A washing system for a filter having a filter bed for improving distribution of a washing fluid through the filter bed, said washing system including:
(a) a flume having at least one of a top wall and a bottom wall, said flume further including a left sidewall and a right sidewall;
(b) a first underdrain lateral and a second underdrain lateral, said first underdrain lateral and said second underdrain lateral being operably connected to said flume; and,
(a) a distribution box providing a first flow area between said flume and said first underdrain lateral and a second flow area between said flume and said second underdrain lateral, said first flow area being greater than said second flow area to compensate for different piezometric heads at said first underdrain lateral and said second underdrain lateral, said distribution member being secured such that said distribution member does not move relative to said flume said distribution box including at least two walls of said flume, said distribution box further including a removable distribution plate having at least one knock-out for varying a size of at least one of said first flow area and said second flow area.

12. A washing system as set forth in claim 11, wherein:
(a) said removable distribution plate extends substantially the entire length of said flume.

13. A washing system as set forth in claim 11, wherein:
(a) said distribution box is configured to occupy less than 10 percent of the volume of said flume.

14. A washing system as set forth in claim 11, wherein:
(a) said distribution box is configured to occupy less than 1 percent of the volume of said flume.

15. A washing system for a filter having a filter bed for improving distribution of a washing fluid through the filter bed, said washing system including:
(a) a flume having at least one of a top wall and a bottom wall, said flume further including a left sidewall and a right sidewall;
(b) a first underdrain lateral and a second underdrain lateral, said first underdrain lateral and said second underdrain lateral being operably connected to said flume; and,
(c) a distribution member providing a first flow area between said flume and said first underdrain lateral and a second flow area between said flume and said second underdrain lateral, said first flow area being larger than said second flow area, said distribution member including a single plate having a first section forming said first flow area and a second section forming said second flow area, said single plate including at least one knock-out for varying a size of at least one of said first flow area and said second flow area.

16. A washing system for a filter having a filter bed for improving distribution of a washing fluid through the filter bed, said washing system including:

(a) a flume having at least one of a top wall and a bottom wall, said flume further including a left sidewall and a right sidewall;

(b) a first underdrain lateral and a second underdrain lateral, said first underdrain lateral and said second underdrain lateral being operably connected to said flume; and, (a) a distribution member having first and second sections, said first section forming a flow area between said flume and said first underdrain lateral, said second section forming a flow area between said flume and said second underdrain lateral, at least one of said first and second sections including a plurality of knock-outs for varying a size of a corresponding flow area.

17. A washing system for a filter having a filter bed for improving distribution of a washing fluid through the filter bed, said washing system including:

(a) a fluid distribution chamber and at least first and second underdrain laterals operably associated with said fluid distribution chamber to direct a washing fluid through a filter bed of a filter; and (b) a distribution member for providing an interface between at least a portion of a fluid distribution chamber and at least first and second underdrain laterals, said distribution member being configured to provide a first flow area through which a washing fluid passes from said distribution chamber into said first underdrain lateral and a second flow area through which a washing fluid passes from said distribution chamber into said second underdrain lateral, said first flow area being different from said second flow area to compensate for different piezometric heads at said first underdrain lateral and said second underdrain lateral, said fluid distribution member being positioned entirely on one side of a vertical plane bisecting said fluid distribution chamber into two equal parts, said distribution member including at least one knock-out for varying a size of at least one of said first flow area and said second flow area.

18. A system for a filter having a filter bed for improving distribution of a fluid through the filter bed, said system including:

(a) a distribution member for providing an interface between at least a portion of a fluid distribution chamber and an underdrain chamber located under a filter bed, said distribution member being configured to provide a first flow area through which a fluid passes from said distribution chamber into a first portion of said underdrain chamber and a second flow area through which a fluid passes from said distribution chamber into a second portion of said underdrain chamber, said first flow area being different from said second flow area to compensate for different piezometric heads at said first portion of said underdrain chamber and said second portion of said underdrain chamber, said distribution member having a substantially L-shaped cross-section, said distribution member including at least one knock-out for varying a size of at least one said first flow area and said second flow area.

19. A system as set forth in claim 18, wherein:

(a) said fluid distribution chamber is an end flume having a floating sidewall, said underdrain chamber is formed by a first underdrain lateral and a second underdrain lateral, said first underdrain lateral and said second underdrain lateral extend under a bottom surface of said floating sidewall of said flume; and, (b) said distribution member is a plate extending substantially the length of said floating sidewall of said flume, said plate having a thickness substantially less than a thickness of said floating sidewall of said flume.

\* \* \* \* \*